(12) United States Patent  (10) Patent No.: US 8,678,274 B1
Madej  (45) Date of Patent: Mar. 25, 2014

(54) POINT-OF-TRANSACTION CHECKOUT SYSTEM FOR AND METHOD OF PROCESSING TARGETS ELECTRO-OPTICALLY READABLE BY A CLERK-OPERATED WORKSTATION AND BY A CUSTOMER-OPERATED ACCESSORY READER

(75) Inventor: Dariusz J. Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/599,383

(22) Filed: Aug. 30, 2012

(51) Int. Cl.
*G06Q 40/00* (2012.01)

(52) U.S. Cl.
USPC .......................................................... 235/379

(58) Field of Classification Search
USPC ................................................. 235/379–380
See application file for complete search history.

(56) References Cited

U.S. PATENT DOCUMENTS

| | | | |
|---|---|---|---|
| 7,416,127 B2 | 8/2008 | Page | |
| 7,519,239 B2 | 4/2009 | Hepworth et al. | |
| 7,527,203 B2 | 5/2009 | Bremer et al. | |
| 7,757,955 B2 | 7/2010 | Barkan | |
| 7,841,524 B2 | 11/2010 | Schmidt et al. | |
| 8,146,822 B2 | 4/2012 | Drzymala et al. | |
| 8,496,178 B2 * | 7/2013 | Gregerson et al. | ........ 235/462.32 |
| 2009/0084854 A1 | 4/2009 | Carlson et al. | |
| 2010/0001075 A1 | 1/2010 | Barkan | |
| 2010/0019042 A1 | 1/2010 | Barkan | |
| 2011/0309147 A1 | 12/2011 | Barkan et al. | |
| 2012/0160917 A1 | 6/2012 | Barkan et al. | |
| 2013/0015242 A1 * | 1/2013 | White | ........................ 235/383 |

OTHER PUBLICATIONS

Parikh, D., "Localization and Segmentation of a 2D High Capacity Color Barcode," Application of Computer Vision, Jan. 7-9, 2008, 7 pages.

* cited by examiner

*Primary Examiner* — Christle Marshall
(74) *Attorney, Agent, or Firm* — Nong-Qiang Fan

(57) ABSTRACT

A checkout system for, and a method of, processing target data electro-optically readable by a clerk-operated workstation and a customer-operated accessory reader, include a data capture arrangement at the workstation for capturing target data associated with products to be checked out by the clerk in a transaction, and a data capture assembly at the accessory reader for capturing additional target data related to the transaction. A workstation microprocessor processes the target data during an active mode, and stands by during a standby mode. An accessory microprocessor acquires the additional target data, and sends the acquired additional target data to the workstation microprocessor for processing during the standby mode.

20 Claims, 7 Drawing Sheets

POINT-OF-TRANSACTION CHECKOUT SYSTEM FOR AND METHOD OF PROCESSING TARGETS ELECTRO-OPTICALLY READABLE BY A CLERK-OPERATED WORKSTATION AND BY A CUSTOMER-OPERATED ACCESSORY READER

FIELD OF THE DISCLOSURE

The present disclosure relates generally to a point-of-transaction system and, more particularly, to a checkout system for, and a method of, processing targets electro-optically readable by image capture by a clerk-operated workstation and by a customer-operated accessory reader and, still more particularly, to reducing an image processing burden imposed on the accessory reader.

BACKGROUND

In the retail industry, horizontal or flat bed slot scanners, each having a single horizontal window; vertical slot scanners, each having a single upright or vertical window; and bi-optical scanners, each having both a horizontal window and an upright window, have been used to electro-optically read targets, such as one-dimensional bar code symbols, particularly of the Universal Product Code (UPC) type, and two-dimensional bar code symbols, such as PDF417 and QR codes, at full-service, point-of-transaction checkout systems operated by checkout clerks in supermarkets, warehouse clubs, department stores, and other kinds of retailers, for many years. Products to be purchased bear identifying target symbols and are typically slid by a clerk across a respective window, e.g., from right to left, or from left to right, in a "swipe" mode. Alternatively, the clerk merely presents the target symbol on the product to, and holds the product momentarily steady at, a central region of a respective window in a "presentation" mode. The choice depends on the type of target, on clerk preference, and on the layout of the system.

Some checkout systems are laser-based, and project a multitude of laser scan lines through a respective window. When at least one of the scan lines sweeps over a target symbol associated with a product, the symbol is processed, decoded and read. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the respective window as a scan pattern of the laser scan lines.

Other checkout systems are imager-based, and have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a respective window over a field of view, and for projecting the return light onto the sensor array to initiate capture of an image of the target over a range of working distances in which the target can be read. The target may be a symbol, as described above, either printed on a label or displayed on a display screen of an electronic device, such as a smart phone. The target may also be a form, such as a document, label, receipt, signature, driver's license, employee badge, or payment/loyalty card, etc., each bearing alphanumeric characters, as well as a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into data related to the target being read, e.g., decoded data indicative of a symbol, or into a picture of a target other than a symbol.

All of the above-described systems are typically operated by checkout clerks. In an effort to reduce, if not eliminate, the need for checkout clerks and their associated labor cost, and to improve the speed and efficiency of the checkout operation, a number of self-service, point-of-sale, checkout systems operated by the customer without the aid of the checkout clerk have been proposed. During operation of a self-service checkout system, the customer retrieves the individual products for purchase from a shopping cart or basket and/or from an entrance conveyor belt at the countertop, and moves the retrieved individual products across, or presents the individual products to, a scanner window to read their respective symbols, and then places the read products onto an exit conveyor belt at the countertop for delivery to a bagging station, or directly into carry-out bags, if desired. The customer then pays for his or her purchases either at the self-service checkout system if so equipped with a credit/debit card reader, or at a central payment area that is staffed by a store employee. Thus, the self-service checkout system permits the customer to select, itemize, and, in some cases, pay for his or her purchases, without the assistance of the retailer's personnel.

However, self-service is not readily available if the aforementioned and increasingly popular, bi-optical workstation is installed at a checkout system. The upright window faces the clerk, not the customer. A rear wall of the bi-optical workstation rises from the countertop and faces the customer. As a result, the customer does not have ready access to either window of the bi-optical workstation and cannot assist in the checkout procedure, even if the customer wanted to, because the rear wall blocks such access. This lack of self-service potentially causes such bi-optical workstations to go unused or underutilized, and their expense to be economically unjustified. Bi-optical workstations occupy valuable real estate in a retailer's operation, which might otherwise be used for self-service systems.

In order to have the customer participate in the checkout procedure despite the presence of the bi-optical workstation, it has been proposed to install a supplemental accessory reader at the checkout system. This accessory reader is independently operated by the customer. For example, this accessory reader can be used to read any target, such as a printed code, or a displayed code, or a non-coded target, independently of the assistance of the clerk. These targets might be provided on loyalty cards, identification cards, coupons, smartphones, and even countertop merchandise bought on impulse. For such reasons, among others, as privacy, hygiene, and security, many customers do not wish to hand over identification cards, such as drivers' licenses containing age data, to the clerk, and would instead prefer to operate the accessory reader. Due to the increasing popularity of coupons being delivered over smartphones, and thus the increased likelihood that the customer's smartphone will be handled during checkout, many retailers also prefer that the customer operate the accessory reader out of concern for legal liability in the event that the clerk accidentally drops the customer's smartphone.

However, as advantageous as the use of such accessory readers has been, one concern relates to such factors as the size, the weight, the cost, and the image processing burden imposed on the accessory reader. Since the accessory reader is a supplemental item, it is desirable to minimize these factors. A microprocessor and/or a separate decoder circuit onboard the accessory reader is tasked with processing and decoding the images captured by the accessory reader, thereby requiring this microprocessor/decoder circuit to be full-featured and robust, both of which increases the expense, size and weight of the accessory reader.

Accordingly, there is a need to reduce the image processing burden imposed on the accessory reader and to make the accessory reader smaller in size, lighter in weight, and less expensive in cost than heretofore.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
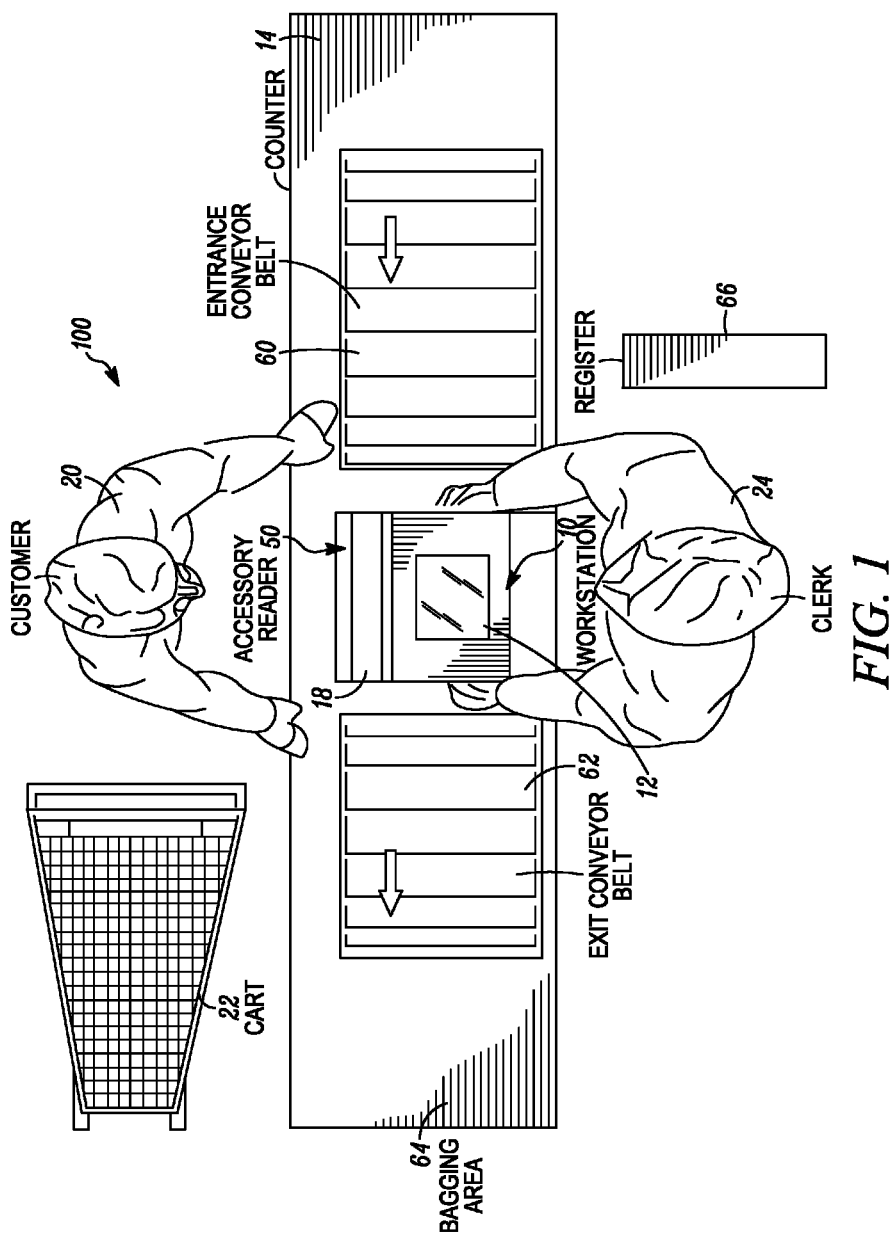
FIG. 1 is a top plan view of one embodiment of a checkout system for processing targets electro-optically readable by image capture by a clerk-operated workstation and by a customer-operated accessory reader in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this invention relates to a checkout system comprising a workstation that is operated by a clerk and an accessory reader that is operated by a customer. The workstation has a data capture arrangement for capturing target data associated with products to be checked out by the clerk in a transaction. The data capture arrangement includes a workstation microprocessor for processing the target data during an active mode, and for standing by during a standby mode. The accessory reader has a data capture assembly for capturing additional target data related to the transaction. The data capture assembly of the accessory reader includes an accessory microprocessor for acquiring the additional target data, and for sending the acquired additional target data to the workstation microprocessor for processing during the standby mode.

Advantageously, both the data capture arrangement and the data capture assembly capture the target data and the additional target data as images. Thus, image processing is tasked away from the accessory microprocessor of the accessory reader to the workstation microprocessor, and is performed when the workstation microprocessor is not actively processing the images from the target data, i.e., during the standby mode. The image processing burden imposed on the accessory microprocessor of the accessory reader is reduced, and concomitantly, the accessory reader can be made smaller in size, lighter in weight, and less expensive in cost than heretofore.

In a preferred embodiment, the workstation is configured as a bi-optical workstation having a first workstation window located in a generally horizontal plane, and a second workstation window located in a generally upright plane that intersects the generally horizontal plane. Both of the workstation windows face and are accessible to the clerk for enabling the clerk to interact with the workstation. The data capture arrangement at the workstation includes at least one solid-state workstation imager for capturing through at least one of the workstation windows an image of the target data. The workstation microprocessor is operative for processing the image during the active mode.

In the preferred embodiment, the accessory reader has an accessory window facing and being accessible to the customer for enabling the customer to interact with the accessory reader. The accessory reader can be located on, or remote from, the workstation. The data capture assembly at the accessory reader includes at least one solid-state accessory imager for capturing through the accessory window an image of the additional target data. The accessory microprocessor is operative for acquiring the image of the additional target data, and for sending the acquired image of the additional target data to the workstation microprocessor for processing during the standby mode. The data capture assembly also includes an accessory memory accessible by the accessory microprocessor for buffering multiple frames of the image of the additional target data while waiting for the workstation microprocessor to enter the standby mode.

Advantageously, the workstation includes an object sensor for detecting when each product enters the workstation. The workstation microprocessor initiates the active mode when the object sensor detects entry of a product into the workstation. The object sensor is also operative for detecting when each product exits the workstation. The workstation microprocessor initiates the standby mode when the object sensor detects exit of a product from the workstation, or when the workstation microprocessor has successfully processed the target data during the active mode.

A method, in accordance with another aspect of this invention, is performed by capturing target data associated with products to be checked out at a workstation operated by a clerk in a transaction, by processing the target data during an active mode of a workstation microprocessor, and by standing by during a standby mode of the workstation microprocessor;

and by capturing additional target data related to the transaction at an accessory reader operated by a customer, by acquiring the additional target data with an accessory microprocessor, and by sending the acquired additional target data to the workstation microprocessor for processing during the standby mode.

Figure 2:
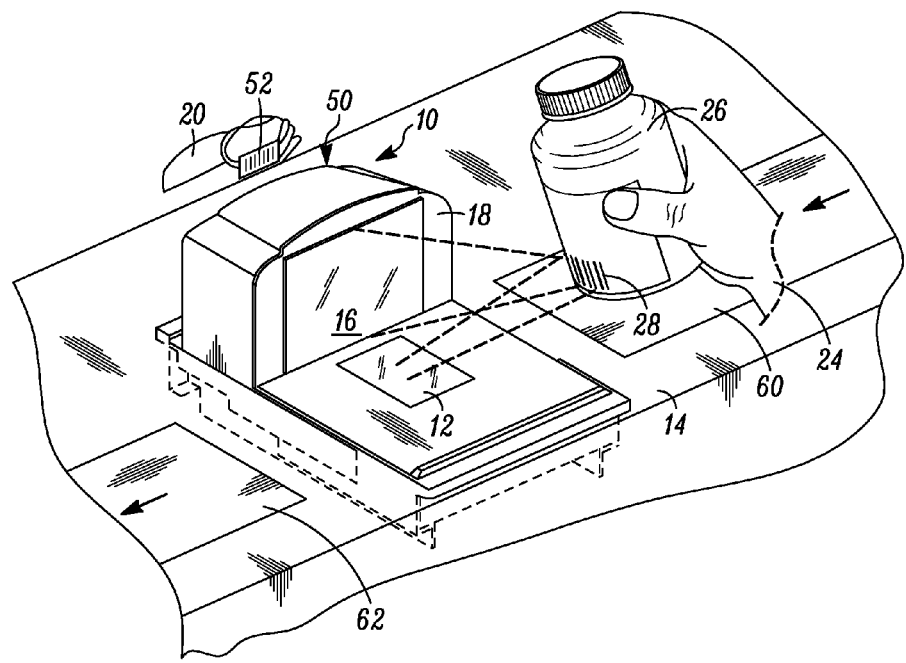
FIG. 2 is a broken-away perspective view of the system of FIG. 1, as seen from the viewpoint of a clerk.
Figure 3:
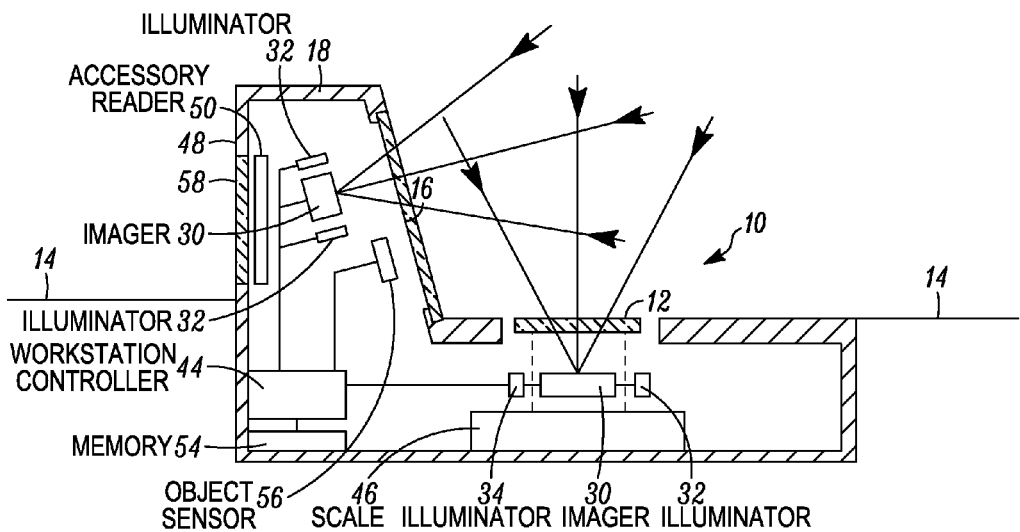
FIG. 3 is a schematic diagram of various components of the workstation of FIG. 1.

A checkout system 100, as depicted in the embodiment of FIG. 1, includes a dual window, bi-optical, point-of-transaction workstation 10 used by retailers at a checkout counter to process transactions involving the purchase of products 26 (see FIG. 2) bearing an identifying target, such as the UPC symbol 28 described above. As best seen in FIGS. 2-3, the workstation 10 has a generally horizontal window 12 elevated, or set flush with, a countertop 14, and a vertical or generally vertical, i.e., tilted, (referred to as "upright" hereinafter) window 16 set flush with, or recessed into, a raised housing portion 18 above the countertop 14. The workstation 10 either rests directly on the countertop 14, or rests in a well formed in the countertop 14. The raised housing portion 18 has a rear wall 48.

Returning to FIG. 1, both of the windows 12, 16 are positioned to face and be accessible to a clerk 24 standing at one side of the countertop 14 for enabling the clerk 24 to interact with the workstation 10, and with a cash register 66 to enable the clerk to receive payment for the purchased products. The register 66 may include a debit/credit card reader and a receipt printer to print a receipt. A keypad may also be provided at the register 66 to enable manual entry of information, such as an identifying code for any purchased product not bearing a symbol, by the clerk 24.

An entrance conveyor belt 60 is optionally located at the countertop 14 at one side of the workstation 10, for conveying the products 26 to the workstation 10. The products 26 are typically placed on the entrance conveyor belt 60 by a customer 20 standing at the opposite side of the countertop 14. The customer 20 typically retrieves the individual products for purchase from a shopping cart 22 or basket for placement on the entrance conveyor belt 60. An exit conveyor belt 62 is optionally located at the countertop 14 at the opposite side of the workstation 10, for conveying the products 26 placed on the exit conveyor belt 62 by the clerk 24 away from the workstation 10, preferably to a bagging area 64.

As previously described, the rear wall 48 of the bi-optical workstation 10 rose from the countertop 14 and faced the customer 20 in the prior art. As a result, the customer 20 did not have ready access to either window 12 or 16 of the bi-optical workstation 10 and could not assist in the checkout procedure, even if the customer 20 wanted to, because the rear wall 48 blocked such access. Thus, in order to have the customer 20 participate in the checkout procedure despite the presence of the bi-optical workstation 10, a supplemental accessory reader 50 is provided at the checkout system 100. This accessory reader 50 is located on, or built into, the workstation 10, as shown in the embodiment of FIGS. 1-5, and is independently operated by the customer 20. This accessory reader 50 can be used to read any target, such as a printed code, or a displayed code, or a non-coded target, independently of the assistance of the clerk 24. These targets might be loyalty cards, identification cards, coupons, and even countertop merchandise bought on impulse. For reasons of privacy and security, many customers do not wish to hand over identification cards, such as drivers' licenses 52 (see FIG. 2) containing age data, to the clerk 24, and would instead prefer to operate the accessory reader 50 themselves.

As schematically shown in FIG. 3, a data capture arrangement, advantageously including a plurality of imaging readers, each including a solid-state workstation imager 30 and an illuminator 32, is mounted at the workstation 10, for capturing light passing through either or both windows 12, 16 from a target that can be a one- or two-dimensional symbol, such as a two-dimensional symbol on a driver's license, or any document. Each workstation imager 30 is a solid-state area array, preferably a CCD or CMOS array. Each workstation imager 30 preferably has a global shutter. Each illuminator 32 is preferably one or more light sources, e.g., one or more surface-mounted, light emitting diodes (LEDs), located at each workstation imager 30 to uniformly illuminate the target.

In use, the clerk 24 processes each product 26 bearing a UPC symbol 28 thereon, past the windows 12, 16 by swiping the product 26 across a respective window, or by presenting the product 26 by holding it momentarily steady at the respective window. The symbol 28 may be located on any of the top, bottom, right, left, front and rear, sides of the product, and at least one, if not more, of the workstation imagers 30 will capture the illumination light reflected, scattered, or otherwise returning from the symbol through one or both windows as an image. FIG. 2 also schematically depicts that a weighing scale 46 can be mounted at the workstation 10. The generally horizontal window 12 advantageously serves not only as a weighing platter for supporting a product to be weighed, but also allows the return light to pass therethrough.

As schematically shown in FIG. 3, an object sensor 56 is also mounted at the workstation 10 for detecting when each product 26 enters and exits the workstation 10. The object sensor 56 may advantageously include two pairs of infrared (IR) emitters and detectors. The workstation imagers 30, the associated illuminators 32, and the object sensor 56 are operatively connected to a programmed workstation microprocessor or controller 44 operative for controlling the operation of these and other components. Preferably, the workstation microprocessor 44 is tasked with processing the return light scattered from the target, and with decoding the captured target image of the return light. A memory 54 is operatively bidirectionally connected to the workstation microprocessor 44.

In operation, an active mode for the workstation microprocessor 44 is initiated when the object sensor 56 detects that a product 26 has entered the workstation 10. The workstation microprocessor 44 then sends successive command signals to the illuminators 32 to pulse the LEDs for a short time period of 300 microseconds or less, and successively energizes the workstation imagers 30 to collect light from a target only during said time period, also known as the exposure time period. By acquiring a target image during this brief time period, the image of the target is not excessively blurred even in the presence of relative motion between the workstation imagers and the target. A typical array needs about 11 to 33 milliseconds to acquire the entire target image and operates at a frame rate of about 30 to 90 frames per second. The array may have on the order of one million addressable sensors. The active mode ends when the object sensor 56 detects that the product 26 has exited the workstation 10, or when the workstation microprocessor 44 has successfully decoded the target. Once the active mode ends, then a standby mode, as described below, begins.

Figure 4:
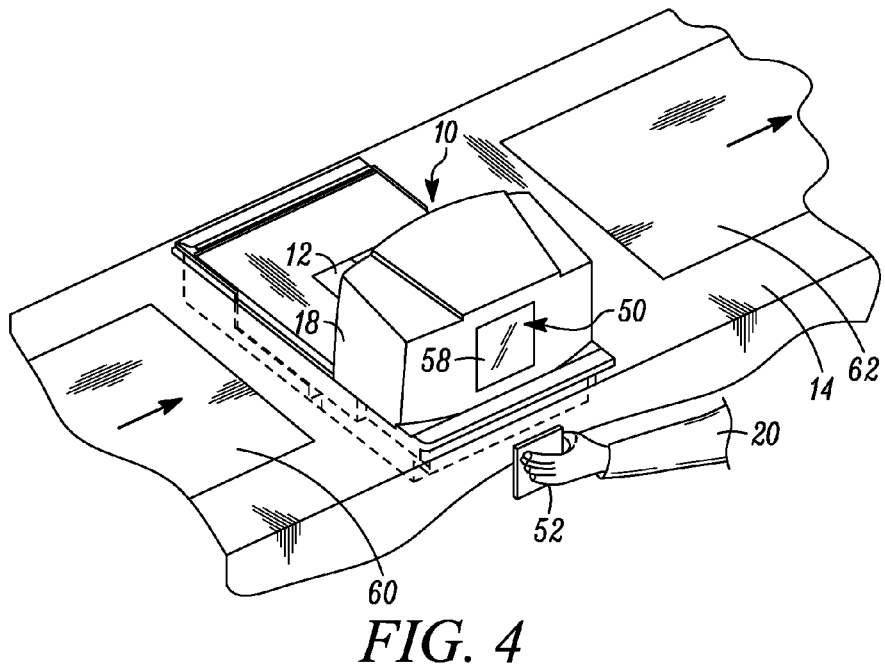
FIG. 4 is a broken-away perspective view of the system of FIG. 1, as seen from the viewpoint of a customer.

Turning now to FIG. 4, the built-in accessory reader 50 has an accessory window 58 on the rear wall 48 and is positioned to face and be accessible to the customer 20. In use, the customer 20 processes each target 52 past the accessory window 58 by swiping the target 52 across the accessory window 58, or by presenting the target 52 by holding it momentarily steady at the accessory window 58. The accessory reader 50 also has a data capture assembly for capturing additional target data related to the transaction.

Figure 5:
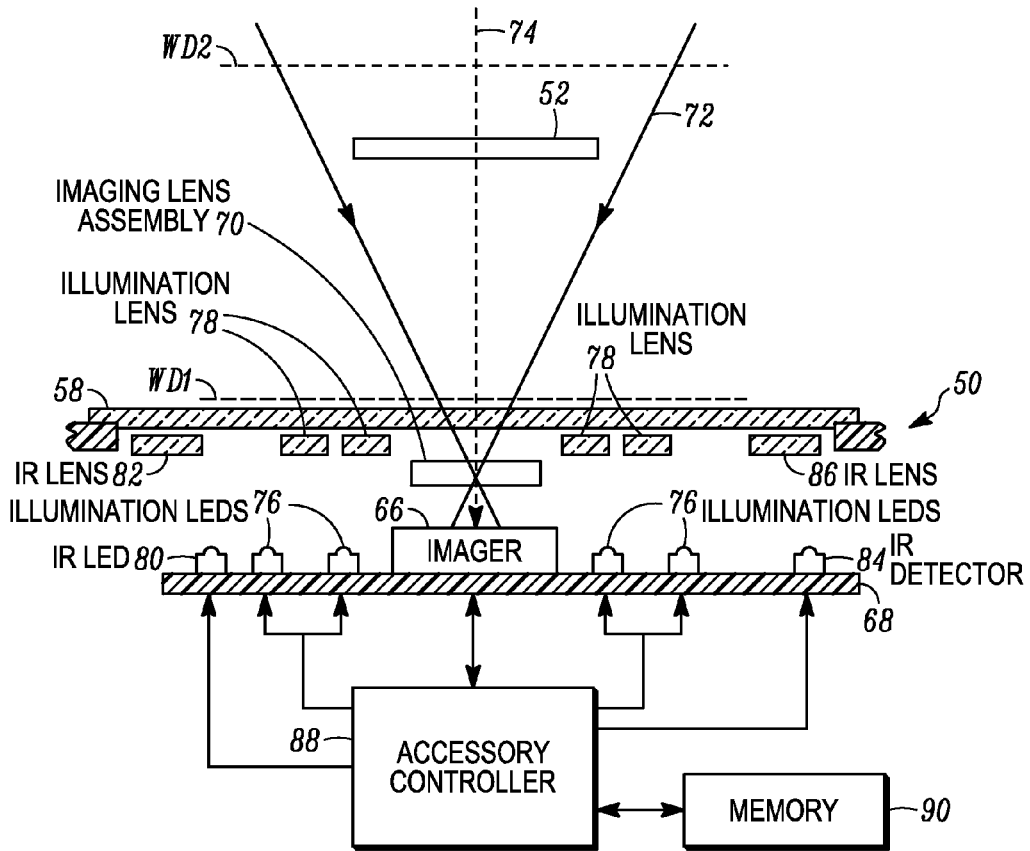
FIG. 5 is a schematic diagram of various components of the accessory reader of FIG. 1.

As schematically shown in FIG. 5, the data capture assembly of the accessory reader 50 includes an image sensor or imager 66 mounted on a printed circuit board (PCB) 68, and an imaging lens assembly 70 mounted in front of the imager 66. The imager 66 is a solid-state device, for example, a CCD or a CMOS imager and has a linear or area array of addressable image sensors or pixels, preferably of submegapixel or supermegapixel size, having a reading field of view 72 that diverges away from the window 58 in both horizontal and vertical directions. The imaging lens assembly 70 has an optical axis 74 generally perpendicular to the window 58 and is operative for capturing light through the window 58 from the target 52 located in a range of working distances along the optical axis 74 between a close-in working distance (WD1) and a far-out working distance (WD2), and for projecting the captured light onto the imager 66. In a preferred embodiment, WD1 is about two inches from the imager 66 and generally coincides with the window 58, and WD2 is about eight inches or more from the window 58.

An illumination light assembly is also mounted in the accessory reader 50 and preferably includes a plurality of illumination light sources, e.g., two pairs of light emitting diodes (LEDs) 76, mounted on the PCB 68 and arranged at opposite sides of the imager 66. Two pairs of illumination lenses 78 are mounted in front of the illumination LEDs 76 to uniformly illuminate the target 52 with illumination light.

An object sensing system is also mounted in the accessory reader 50 and is operative for sensing entry and exit of the target 52 relative to the field of view 72 of the accessory reader 50, and for generating corresponding trigger signals. The object sensing system includes an object light source, preferably an infrared (IR) light emitting diode (LED) 80 mounted on the PCB 68, and an IR lens 82 mounted in front of the IR LED 80, and together operative for directing object sensing IR light, which is invisible to the human eye, in a wavelength range from about 700 nm to about 1100 nm, over a viewing angle through the window 58 at the target 52 for return therefrom through an IR lens 86, and for detection by an object light detector 84 for detecting return object sensing IR light returned from the target 52 through the window 58 over an object detection field of view. The viewing angle of the IR LED 80 is approximately equal to the object detection field of view of the IR light detector 84 for better system efficiency and pointing in the direction of the object of interest. The object detection field of view substantially overlaps the reading field of view 72.

Returning to FIG. 5, the imager 66, the illumination LEDs 76 and the IR LED/detector 80, 84 are operatively connected to a controller or programmed accessory microprocessor 88 operative for controlling the operation of these electrical components. A memory 90 is connected and accessible to the accessory microprocessor 88. In operation, the accessory microprocessor 88 sends a command signal to energize the object sensing system to detect whether the target 52 has entered the field of view of the accessory reader 50 from either the right or left sides thereof. If so, a trigger signal is generated to advise the accessory microprocessor 88 to send a command signal to energize the illumination system to pulse the illumination LEDs 76 for a short time period of, for example, 500 microseconds or less, and to energize the imager 66 to collect illumination light reflected and/or scattered from the target 52 substantially only during said time period. A typical imager needs about 16-33 milliseconds to read the entire target image and operates at a frame rate of about 30-90 frames per second. The memory 90 can buffer multiple images of the target 52 captured over successive frames.

In accordance with this invention, the accessory microprocessor 88 is not tasked with processing and decoding the image from the target 52. Instead, the accessory microprocessor 88 is tasked with acquiring the additional target data from the target 52, and for sending the acquired additional target data to the workstation microprocessor 44, which then is responsible for processing and decoding the image from the target 52. This processing and decoding of the image from the target 52 is performed during the aforementioned standby mode, when the workstation microprocessor 44 is not occupied with processing and decoding the image from the target 28. Thus, image processing is tasked away from the accessory microprocessor 88 of the accessory reader 50 to the workstation microprocessor 44, and is performed when the workstation microprocessor 44 is not actively processing any images, i.e., during the standby mode. The image processing burden imposed on the accessory microprocessor 88 of the accessory reader 50 is reduced, and concomitantly, the accessory reader 50 can be made smaller in size, lighter in weight, and less expensive in cost than heretofore.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Figure 6:
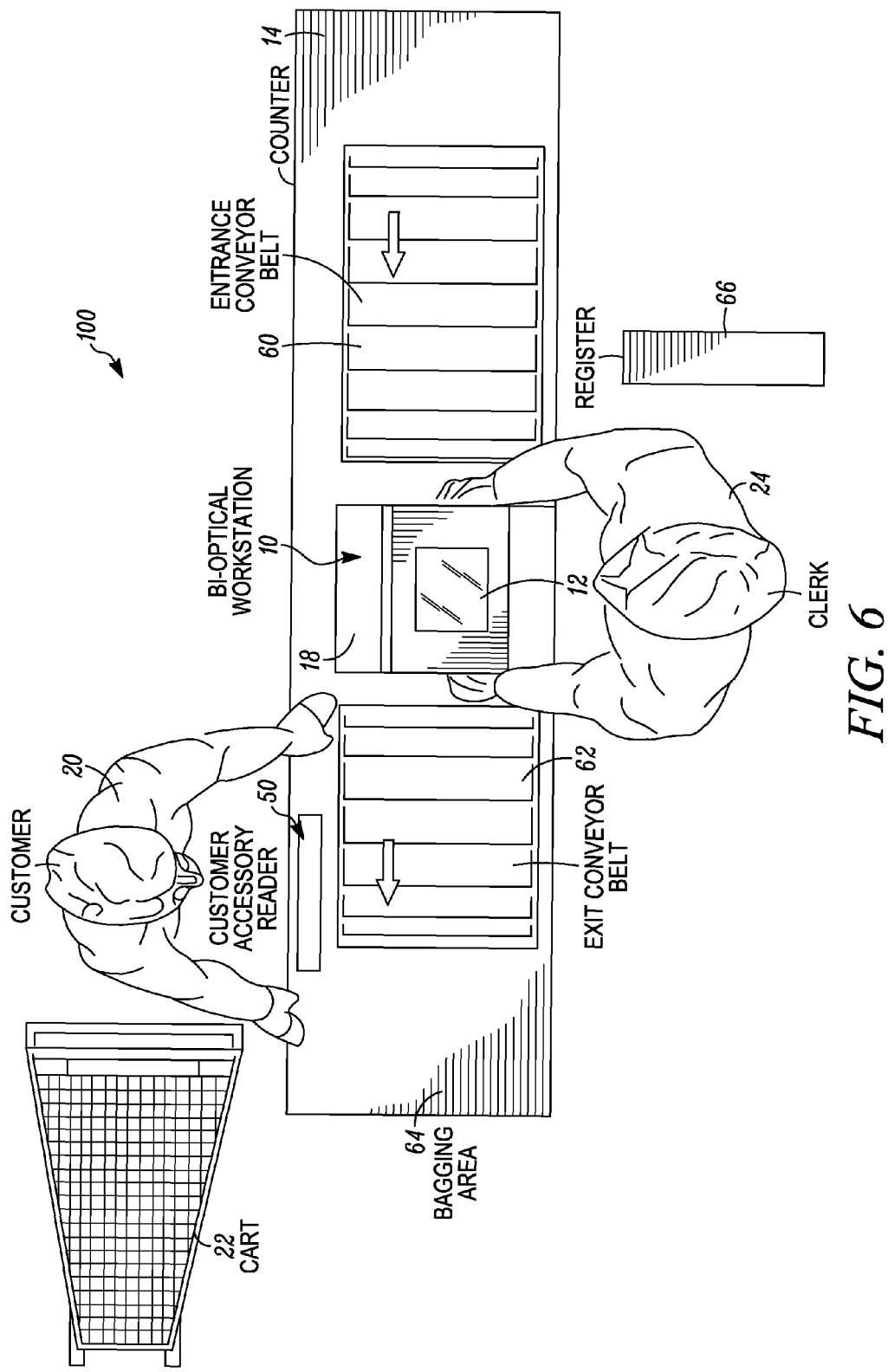
FIG. 6 is a top plan view of another embodiment of a checkout system for processing targets electro-optically readable by image capture by a clerk-operated workstation and by a customer-operated accessory reader in accordance with this invention.

As an examples, FIG. 6 depicts the accessory reader 50 located away from the workstation 10. The accessory reader 50 of FIG. 6 need not be configured as a box-shaped housing, as shown, but could instead have any shape, including being configured as a gun-shaped housing. The accessory reader 50 need not be mounted on the countertop 14, as shown, but could instead be mounted anywhere at the checkout system 100. The accessory reader 50 need not be fixed in position, but could instead be portable and lightweight and removable from the countertop 14 by the customer 20, in order to aim the accessory window 58 at the target 52, preferably at a target too heavy, or too large, or too bulky to be easily positioned in front of the accessory window 58.

As further examples, the workstation 10 need not be configured as a bi-optical workstation, but could instead be configured as a horizontal or flat bed slot scanner having a single horizontal window; or as a vertical slot scanner having a single upright or vertical window. The workstation 10 and/or the accessory reader need not be imager-based, but could instead be laser-based. An imager-based workstation need not have the configuration depicted in FIG. 3, but instead could have one or more imagers, each having a field of view split by optical splitters and by a plurality of fold mirrors into a plurality of subfields for greater coverage.

Still further, in some known accessory readers, the processing and decoding functions are not performed wholly inside the accessory microprocessor 88, but instead are at least partially performed by a separate, external decoder circuit. In accordance with this invention, that decoder circuit can be eliminated, because the decoding function has been assigned to the workstation microprocessor 44. In addition, the memory 90 need not buffer the successive images of the target 52 while waiting for the workstation microprocessor 44 to enter the standby mode, but instead can send the captured images to the workstation memory 54, or directly to the workstation microprocessor 44 over a direct memory access (DMA) channel. In the event that the workstation microprocessor 44 has not entered the standby mode for a long time, it is contemplated that a captured image of the target 52 could be interleaved with a captured image of the product 26.

As still further examples, the object sensing system need not be IR-based, but could instead be any motion or proximity sensor. In addition, the data capture arrangement of the workstation 10 and/or the data capture assembly of the accessory reader 50 could be provided with an aiming light assembly operative for projecting an aiming light pattern or mark, such as a "crosshair" pattern, with aiming light from an aiming light source, e.g., an aiming laser or one or more LEDs, through aiming lenses on the product/target. The clerk/customer aims the aiming pattern on the product/target to be imaged.

Figure 7:
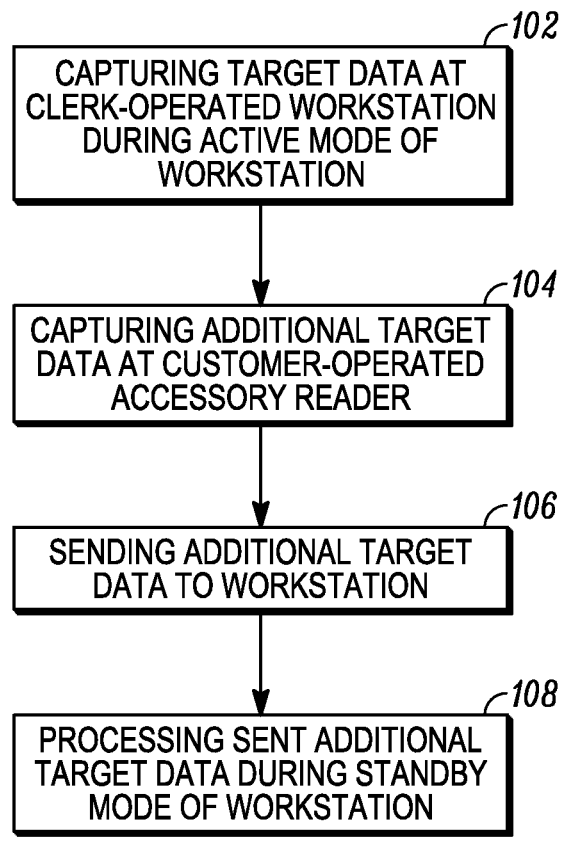
FIG. 7 is a flow chart depicting steps performed in accordance with the method of the present invention.

Turning now to the flow chart of FIG. 7, a checkout method is performed, in step 102, by capturing target data associated with products to be checked out at a workstation 10 operated by a clerk 22 in a transaction, by processing the target data during an active mode of a workstation microprocessor 44, and by standing by during a standby mode of the workstation microprocessor 44. Additional target data related to the transaction is captured, in step 104, at an accessory reader operated by a customer, by acquiring the additional target data with an accessory microprocessor 88. In step 106, the acquired additional target data is sent to the workstation microprocessor 44. In step 108, the sent additional target data is processed by the workstation microprocessor 44 during the standby mode.

Figure 8:
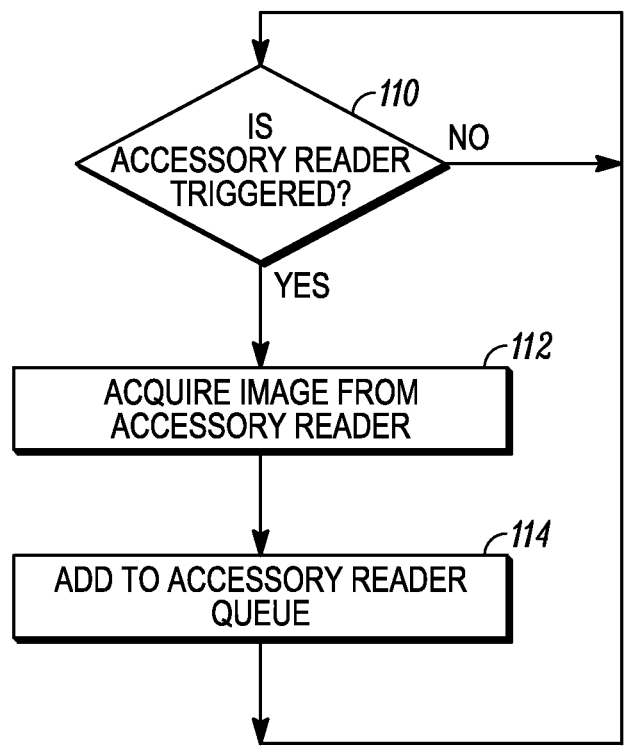
FIG. 8 is a flow chart depicting steps performed during the acquisition and buffering of frames in the accessory reader.

FIG. 8 is a flow chart that illustrates the acquisition and buffering of frames in the accessory reader 50 in more detail. When the accessory reader 50 is triggered in step 110, e.g., by the object sensing system 80, 84, then images are successively acquired by the accessory microprocessor 88 over successive frames in step 112, and added in step 114 to an accessory queue in the accessory memory 90. The accessory queue is a list of frames awaiting further action. The accessory queue advantageously has a limited maximum length (N) and is organized such that the newest frames are in the front of the accessory queue. Thus, if a new frame is added to the accessory queue, then the new frame goes to the front of the queue, and the queue length increases. If the queue length has already reached its maximum length (N), then the oldest frame is discarded. This organization ensues that the accessory queue contains the most recent representation of what the accessory reader 50 is reading. This memory management is not a time-intensive task and requires little computing power and can be performed by the accessory microprocessor 88 and/or by the workstation microprocessor 44, if necessary.

Figure 9:
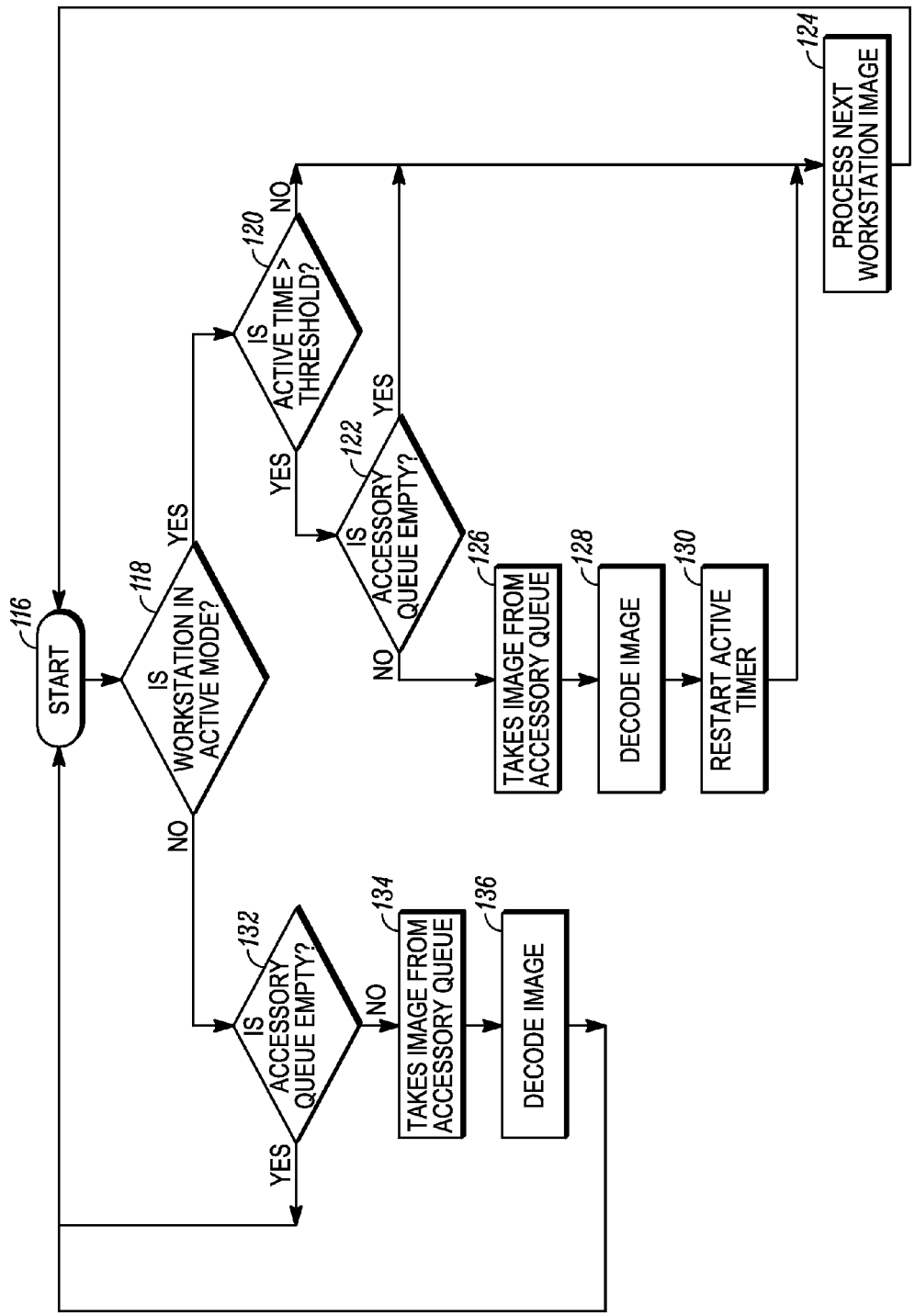
FIG. 9 is a flow chart depicting steps performed during frame management by the workstation.

FIG. 9 is a flow chart that illustrates frame management by the workstation microprocessor 44 in more detail. As described above, the workstation microprocessor 44 needs to process both its own workstation image frames, as well as the accessory image frames captured by the accessory reader 50 with minimum impact on the processing of its own workstation frames. Also, the processing of image frames is a time-sensitive task that consumes a substantial amount of microprocessor time and power.

Starting from a start step 116, the workstation microprocessor 44 first checks, in step 118, whether it is in an active mode or in a standby mode. When the workstation microprocessor 44 is in the active mode, then the workstation microprocessor 44 checks, in step 120, how long it has been in the active mode. If the workstation microprocessor 44 has been in the active mode for a long time, i.e., for a time exceeding a predetermined threshold time, then the workstation microprocessor 44 checks the accessory queue in step 122. If the accessory queue is empty, then the workstation microprocessor 44 processes the next workstation image in step 124 before returning to the start step 116. If the accessory queue is not empty, then the workstation microprocessor 44 takes the most recent frame from the accessory queue in step 126, decodes the most recently taken frame in step 128, resets a timer that measures the duration of the active mode in step 130, and processes the next workstation image in step 124 before returning to the start step 116. Thus, if the workstation microprocessor 44 has been in the active mode for a long time, then the workstation microprocessor 44 may be programmed to process at least one accessory image, and to continue with its primary task of processing workstation images.

If the workstation microprocessor 44 determines, in step 118, that it is not in the active mode, then the workstation microprocessor 44 checks the accessory queue in step 122. If the accessory queue is empty, then the workstation microprocessor 44 returns to the start step 116. If the accessory queue is not empty, then the workstation microprocessor 44 takes the most recent frame from the accessory queue in step 134, decodes the most recently taken frame in step 136, and then returns to the start step 116. Thus, when the workstation microprocessor 44 is in the standby mode, the accessory images in the accessory queue are processed.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A checkout system, comprising:
   a workstation operated by a clerk and having a data capture arrangement for capturing target data associated with products to be checked out by the clerk in a transaction, the data capture arrangement including a workstation microprocessor for processing the target data during an active mode, and for standing by during a standby mode; and
   an accessory reader operated by a customer and having a data capture assembly for capturing additional target data related to the transaction, the data capture assembly including an accessory microprocessor for acquiring the additional target data, and for sending the acquired additional target data to the workstation microprocessor for processing during the standby mode
   wherein the accessory reader has an accessory window being accessible to the customer for enabling the customer to interact with the accessory reader; wherein the data capture assembly at the accessory reader includes at least one solid-state accessory imager for capturing through the accessory window an image of the additional target data; and wherein the accessory microprocessor is operative for acquiring the image of the additional target data, and for sending the acquired image of the additional target data to the workstation microprocessor for processing during the standby mode; and
   wherein the data capture assembly includes an accessory memory accessible by the accessory microprocessor for buffering multiple frames of the image of the additional target data while waiting for the workstation microprocessor to enter the standby mode.

2. A checkout system, comprising:
   a workstation operated by a clerk and having a data capture arrangement for capturing target data associated with products to be checked out by the clerk in a transaction, the data capture arrangement including a workstation microprocessor for processing the target data during an active mode, and for standing by during a standby mode;
   an accessory reader operated by a customer and having a data capture assembly for capturing additional target data related to the transaction, the data capture assembly including an accessory microprocessor for acquiring the additional target data, and for sending the acquired additional target data to the workstation microprocessor for processing during the standby mode;
   wherein the accessory reader has an accessory window facing and being accessible to the customer for enabling the customer to interact with the accessory reader; wherein the data capture assembly at the accessory reader includes at least one solid-state accessory imager for capturing through the accessory window an image of the additional target data and wherein the accessory microprocessor is operative for acquiring the image of the additional target data, and for sending the acquired image of the additional target data to the workstation microprocessor for processing during the standby mode; and
   wherein the data capture assembly includes an accessory memory accessible by the accessory microprocessor for buffering multiple frames of the image of the additional target data while waiting for the workstation microprocessor to enter the standby mode.

3. The system of claim 2, wherein the accessory memory stores images of successive additional target data in a queue, and wherein the accessory memory replaces an old image with a new image when the queue is full.

4. A checkout system, comprising:
   a workstation operated by a clerk and having a data capture arrangement for capturing target data associated with products to be checked out by the clerk in a transaction, the data capture arrangement including a workstation microprocessor for processing the target data during an active mode, and for standing by during a standby mode;
   an accessory reader operated by a customer and having a data capture assembly for capturing additional target data related to the transaction, the data capture assembly including an accessory microprocessor for acquiring the additional target data, and for sending the acquired additional target data to the workstation microprocessor for processing during the standby mode;
   wherein the workstation includes an object sensor for detecting when each product enters the workstation, and wherein the workstation microprocessor initiates the active mode when the object sensor detects entry of a product into the workstation.

5. The system of claim 4, wherein the workstation is a bi-optical workstation having a first workstation window located in a generally horizontal plane, and a second workstation window located in a generally upright plane that intersects the generally horizontal plane, both of the workstation windows facing and being accessible to the clerk for enabling the clerk to interact with the workstation; wherein the data capture arrangement at the workstation includes at least one solid-state workstation imager for capturing through at least one of the workstation windows an image of the target data;

and wherein the workstation microprocessor is operative for processing the image during the active mode.

6. The system of claim 4, wherein the accessory reader has an accessory window facing and being accessible to the customer for enabling the customer to interact with the accessory reader; wherein the data capture assembly at the accessory reader includes at least one solid-state accessory imager for capturing through the accessory window an image of the additional target data; and wherein the accessory microprocessor is operative for acquiring the image of the additional target data, and for sending the acquired image of the additional target data to the workstation microprocessor for processing during the standby mode.

7. The system of claim 4, wherein the object sensor is also operative for detecting when each product exits the workstation, and wherein the workstation microprocessor initiates the standby mode when the object sensor detects exit of a product from the workstation.

8. The system of claim 4, wherein the workstation microprocessor initiates the standby mode when the workstation microprocessor has successfully processed the target data during the active mode.

9. A checkout system, comprising:
a bi-optical workstation operated by a clerk, the workstation having a first workstation window located in a generally horizontal plane, and a second workstation window located in a generally upright plane that intersects the generally horizontal plane, both of the workstation windows facing and being accessible to the clerk for enabling the clerk to interact with the workstation, the workstation also having a data capture arrangement including at least one solid-state workstation imager for capturing through at least one of the workstation windows an image associated with a product to be checked out by the clerk in a transaction, and a workstation microprocessor for processing the image during an active mode, and for standing by during a standby mode;
an accessory reader operated by a customer, the accessory reader having an accessory window being accessible to the customer for enabling the customer to interact with the accessory reader, the accessory reader having a data capture assembly including at least one solid-state accessory imager for capturing through the accessory window an additional image related to the transaction, and an accessory microprocessor for acquiring the additional image, and for sending the acquired additional image to the workstation microprocessor for processing during the standby mode; and
wherein the data capture assembly includes an accessory memory accessible by the accessory microprocessor for buffering multiple frames of the additional image while waiting for the workstation microprocessor to enter the standby mode.

10. A checkout system, comprising:
a bi-optical workstation operated by a clerk, the workstation having a first workstation window located in a generally horizontal plane, and a second workstation window located in a generally upright plane that intersects the generally horizontal plane, both of the workstation windows facing and being accessible to the clerk for enabling the clerk to interact with the workstation, the workstation also having a data capture arrangement including at least one solid-state workstation imager for capturing through at least one of the workstation windows an image associated with a product to be checked out by the clerk in a transaction, and a workstation microprocessor for processing the image during an active mode, and for standing by during a standby mode;
an accessory reader operated by a customer, the accessory reader having an accessory window facing and being accessible to the customer for enabling the customer to interact with the accessory reader, the accessory reader having a data capture assembly including at least one solid-state accessory imager for capturing through the accessory window an additional image related to the transaction, and an accessory microprocessor for acquiring the additional image, and for sending the acquired additional image to the workstation microprocessor for processing during the standby mode; and
wherein the data capture assembly includes an accessory memory accessible by the accessory microprocessor for buffering multiple frames of the additional image while waiting for the workstation microprocessor to enter the standby mode.

11. A checkout system, comprising:
a bi-optical workstation operated by a clerk, the workstation having a first workstation window located in a generally horizontal plane, and a second workstation window located in a generally upright plane that intersects the generally horizontal plane, both of the workstation windows facing and being accessible to the clerk for enabling the clerk to interact with the workstation, the workstation also having a data capture arrangement including at least one solid-state workstation imager for capturing through at least one of the workstation windows an image associated with a product to be checked out by the clerk in a transaction, and a workstation microprocessor for processing the image during an active mode, and for standing by during a standby mode;
an accessory reader operated by a customer, the accessory reader having an accessory window facing and being accessible to the customer for enabling the customer to interact with the accessory reader, the accessory reader having a data capture assembly including at least one solid-state accessory imager for capturing through the accessory window an additional image related to the transaction, and an accessory microprocessor for acquiring the additional image, and for sending the acquired additional image to the workstation microprocessor for processing during the standby mode; and
wherein the workstation includes an object sensor for detecting when the product enters the workstation, and wherein the workstation microprocessor initiates the active mode when the object sensor detects entry of the product into the workstation.

12. The system of claim 11, wherein the object sensor is also operative for detecting when the product exits the workstation, and wherein the workstation microprocessor initiates the standby mode when the object sensor detects exit of the product from the workstation.

13. The system of claim 11, wherein the workstation microprocessor initiates the standby mode when the workstation microprocessor has successfully processed the image during the active mode.

14. A checkout method, comprising:
capturing target data associated with products to be checked out at a workstation operated by a clerk in a transaction, by processing the target data during an active mode of a workstation microprocessor, and by standing by during a standby mode of the workstation microprocessor; and
capturing additional target data related to the transaction at an accessory reader operated by a customer, by acquiring the additional target data with an accessory microprocessor, and by sending the acquired additional target data to the workstation microprocessor for processing during the standby mode;

configuring the accessory reader with an accessory window being accessible to the customer for enabling the customer to interact with the accessory reader, wherein the capturing of the additional target data at the accessory reader is performed by capturing through the accessory window an image of the additional target data, and wherein the acquiring of the additional target data is performed by acquiring the image of the additional target data; and wherein the capturing of the additional target data at the accessory reader is performed by buffering multiple frames of the image of the additional target data while waiting for the workstation microprocessor to enter the standby mode.

15. A checkout method, comprising:

capturing target data associated with products to be checked out at a workstation operated by a clerk in a transaction, by processing the target data during an active mode of a workstation microprocessor, and by standing by during a standby mode of the workstation microprocessor;

capturing additional target data related to the transaction at an accessory reader operated by a customer, by acquiring the additional target data with an accessory microprocessor, and by sending the acquired additional target data to the workstation microprocessor for processing during the standby mode;

configuring the accessory reader with an accessory window facing and being accessible to the customer for enabling the customer to interact with the accessory reader, wherein the capturing of the additional target data at the accessory reader is performed by capturing through the accessory window an image of the additional target data, and wherein the acquiring of the additional target data is performed by acquiring the image of the additional target data; and wherein the capturing of the additional target data at the accessory reader is performed by buffering multiple frames of the image of the additional target data while waiting for the workstation microprocessor to enter the standby mode.

16. A checkout method, comprising:

capturing target data associated with products to be checked out at a workstation operated by a clerk in a transaction, by processing the target data during an active mode of a workstation microprocessor, and by standing by during a standby mode of the workstation microprocessor;

capturing additional target data related to the transaction at an accessory reader operated by a customer, by acquiring the additional target data with an accessory microprocessor, and by sending the acquired additional target data to the workstation microprocessor for processing during the standby mode;

the image of the additional target data; and detecting when each product enters the workstation, and initiating the active mode when entry of a product into the workstation is detected.

17. The method of claim 16, and configuring the workstation as a bi-optical workstation having a first workstation window located in a generally horizontal plane, and a second workstation window located in a generally upright plane that intersects the generally horizontal plane, both of the workstation windows facing and being accessible to the clerk for enabling the clerk to interact with the workstation; wherein the capturing of the target data associated with products at the workstation is performed by capturing through at least one of the workstation windows an image of the target data; and wherein the processing of the target data during the active mode is performed by processing the image during the active mode.

18. The method of claim 16, and configuring the accessory reader with an accessory window facing and being accessible to the customer for enabling the customer to interact with the accessory reader; wherein the capturing of the additional target data at the accessory reader is performed by capturing through the accessory window an image of the additional target data; and wherein the acquiring of the additional target data is performed by acquiring the image of the additional target data.

19. The method of claim 16, and detecting when each product exits the workstation, and initiating the standby mode when exit of a product from the workstation is detected.

20. The method of claim 16, and initiating the standby mode when the target data has been successfully processed by the workstation microprocessor during the active mode.

* * * * *